United States Patent
Lee et al.

(10) Patent No.: US 9,929,953 B2
(45) Date of Patent: Mar. 27, 2018

(54) MAKING A FRAME RECEIVE DECISION IN A RECEIVER PHY LAYER

(71) Applicant: Hewlett-Packard Development Company, L.P., Houston, TX (US)

(72) Inventors: Jung Gun Lee, Palo Alto, CA (US); Sen Souvik, Palo Alto, CA (US); Paul T. Congdon, Palo Alto, CA (US)

(73) Assignee: Hewlett Packard Enterpise Development LP, Houston, TX (US)

( * ) Notice: Subject to any disclaimer, the term of this patent is extended or adjusted under 35 U.S.C. 154(b) by 225 days.

(21) Appl. No.: 14/780,775

(22) PCT Filed: Mar. 28, 2013

(86) PCT No.: PCT/US2013/034412
§ 371 (c)(1),
(2) Date: Sep. 28, 2015

(87) PCT Pub. No.: WO2014/158171
PCT Pub. Date: Oct. 2, 2014

(65) Prior Publication Data
US 2016/0043949 A1 Feb. 11, 2016

(51) Int. Cl.
*H04L 12/741* (2013.01)
*H04L 5/00* (2006.01)
*H04W 74/08* (2009.01)
*H04W 84/12* (2009.01)

(52) U.S. Cl.
CPC ......... *H04L 45/745* (2013.01); *H04L 5/0053* (2013.01); *H04W 74/0858* (2013.01); *H04W 84/12* (2013.01)

(58) Field of Classification Search
CPC ............... H04L 45/745; H04L 5/0053; H04W 74/0858; H04W 84/12
See application file for complete search history.

(56) References Cited

U.S. PATENT DOCUMENTS

| 7,257,095 | B2 | 8/2007 | Liu |
| 2007/0025245 | A1 | 2/2007 | Porras et al. |
| 2009/0181689 | A1* | 7/2009 | Lee ........................ H04L 1/1854 455/450 |

(Continued)

FOREIGN PATENT DOCUMENTS

EP 1875627 A2 1/2008

OTHER PUBLICATIONS

International Search Report and Written Opinion, International Application No. PCT/US2013/034412, dated Dec. 27, 2013, pp. 1-11.

(Continued)

*Primary Examiner* — Ayaz Sheikh
*Assistant Examiner* — Debebe Asefa
(74) *Attorney, Agent, or Firm* — Mannava & Kang, P.C.

(57) ABSTRACT

According to an example, a receiver having a physical (PHY) layer may receive a portion of a frame from a transmitter, in which the portion of the frame comprises information available at the PHY layer. A signature of the transmitter may be determined based upon the information available at the PHY layer and a hardware component in the PHY layer may determine whether to continue to receive the frame based upon the determined signature of the transmitter.

14 Claims, 7 Drawing Sheets

(56) References Cited

U.S. PATENT DOCUMENTS

| | | | |
|---|---|---|---|
| 2009/0190589 A1* | 7/2009 | Bains | H04L 43/106 |
| | | | 370/392 |
| 2010/0112974 A1 | 5/2010 | Sahai et al. | |
| 2010/0208715 A1 | 8/2010 | Bagchi et al. | |
| 2011/0051674 A1 | 3/2011 | Niedzwiecki et al. | |
| 2011/0090844 A1 | 4/2011 | Gong et al. | |
| 2012/0320932 A1 | 12/2012 | Xu et al. | |
| 2013/0155905 A1* | 6/2013 | Sampath | H04W 48/16 |
| | | | 370/255 |

OTHER PUBLICATIONS

M. Vutukuru, "Physical Layer-Aware Wireless Link Layer Protocols," May 21, 2010, pp. 1-134, MIT.

* cited by examiner

MAKING A FRAME RECEIVE DECISION IN A RECEIVER PHY LAYER

BACKGROUND

A client in a wireless network associates with a wireless access point (WAP) to get connectivity, for example, to and from the Internet, and to further communicate with other clients via the wireless network. A client typically relies on one WAP at any given time for all communications in the wireless network. Commonly, the wireless network includes multiple WAPs, each servicing its own set of clients. In these situations, WAPs typically receive communications that are intended for the WAPs as well as communications that are not intended to be received by the WAPs. Conventional WAPs therefore typically receive and process unnecessary frames, which often result in inefficient operations of the WAPs.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
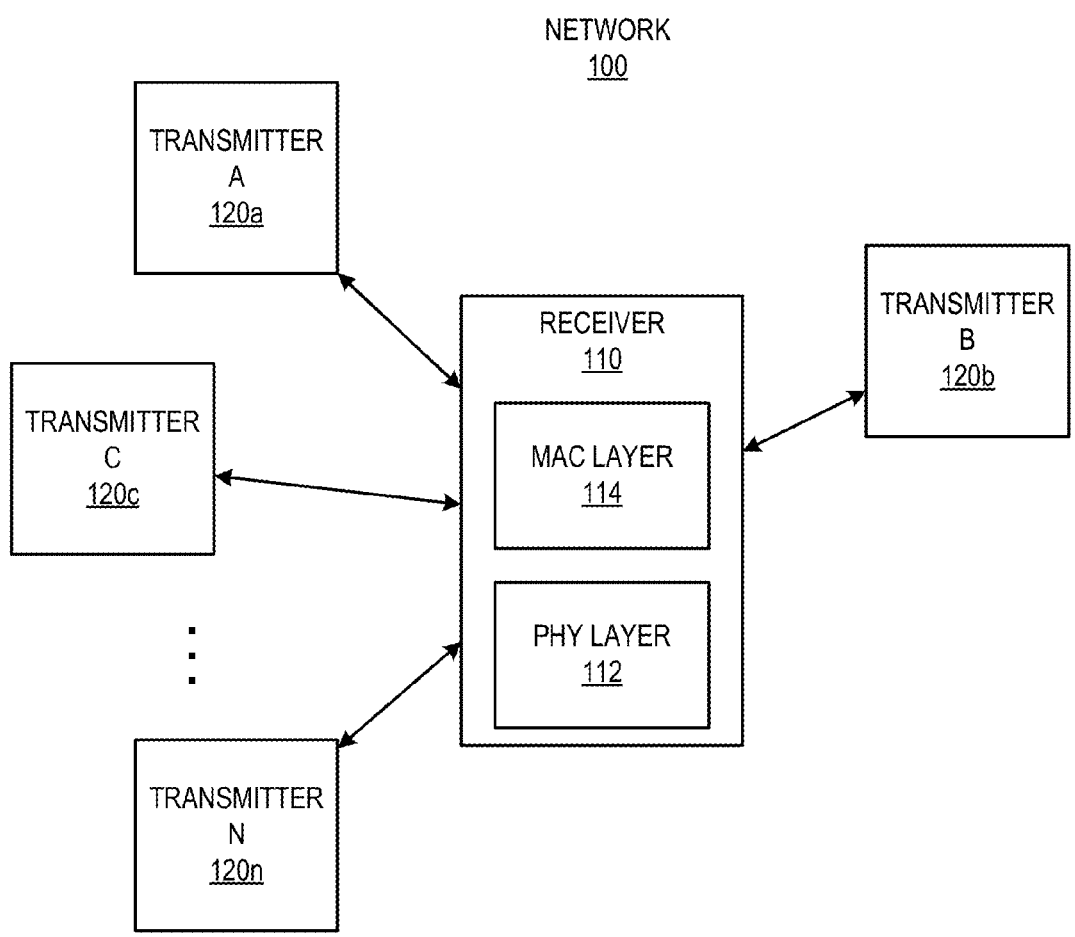
FIG. 1 depicts a simplified block diagram of a network, which may implement various features disclosed herein, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

Generally speaking, wireless communication systems that use contention-based medium access control typically do not have transmitter or receiver identification information in the physical layer header. As such, the receiver's physical (PHY) layer blindly continues to receive and decode a frame for a duration of time that the frame occupies the medium regardless of whether the frame is destined for the receiver. The PHY layer then transfers the decoded frame to the media access control (MAC) layer. The MAC layer includes software modules that examine transmitter and receiver MAC addresses to determine whether the frame is to be forwarded to upper-layer protocols or applications in the receiver. This process is termed the "frame receive decision" herein. The transmitter source MAC and receiver destination MAC addresses are part of the physical layer convergence procedure (PLCP) data payload, which is often encoded at a bitrate higher than that of the PLCP header. Decoding the MAC destination address to decide whether to keep receiving the frame may be a relatively difficult and expensive process.

Disclosed herein are methods and apparatuses in which a frame receive decision may be made at the PHY layer of a receiver, and thus, prior to decoding of the MAC destination address. According to an example, a signature of a transmitter may be determined based upon information contained in the frame that is available in the PHY layer and the frame receive decision may be made in the PHY layer based upon the determined signature. The information contained in the frame that is available in the PHY layer may include, for instance, a center frequency offset (CFO) of the transmitter with respect to the receiver, channel state information (CSI) of the transmitter, etc. In other examples, additional information available in the physical layer, such as signal field information contained in the physical layer header, may also be used in making the frame receive decision in the PHY layer.

In one regard, the methods and apparatuses disclosed herein generally enable the frame receive decision to be made prior to the forwarding of frames to the MAC layer of the receiver, which may prevent the receiver from locking onto the frame unnecessarily. The terms "locking on" may generally be defined as the PHY layer synchronizing to a frame and attempting to continue receiving the frame until the end of the frame transmission.

As discussed herein, by substantially preventing the receiver from locking onto the unnecessary frames, which may be frames that are not intended to be received and processed by the receiver, the receiver may operate in a relatively more efficient manner. That is, the receiver may substantially avoid locking onto the wrong frames, which may improve the receiver's throughput performance. In addition, the PHY carrier sense indicator of the receiver may not unnecessarily assert the BUSY state. Moreover, the receiver may consume relatively less power by not locking onto and receiving unnecessary frames. For instance, the receiver may enter into a sleep mode during the rest of the unnecessary frame.

With reference first to FIG. 1, there is shown a simplified block diagram of a network 100, which may implement various features disclosed herein, according to an example. It should be understood that the network 100 may include additional elements and that some of the elements depicted therein may be removed and/or modified without departing from a scope of the network 100.

The network 100 is depicted as including a receiver 110 and a plurality of transmitters 120a-120n, in which "n" represents an integer greater than 1. The network 100 may represent any type of network, such as a wide area network (WAN), a local area network (LAN), etc., over which frames of data, such as Ethernet frames may be communicated. As such, the receiver 110 may be any type of apparatus that is to receive frames and the transmitters 120*a*-120*n* may be any types of apparatuses that are to transmit frames. In addition, the receiver 110 may also transmit frames and the transmitters 120*a*-120*n* may receive packets. In this regard, the receiver 110 may also perform functions of the transmitters 120*a*-120*n* and the transmitters 120*a*-120*n* may also perform functions of the receiver 110. According to an example, the receiver 110 and the transmitters 120*a*-120*n* are client devices, such as computers, servers, etc., networking equipment, such as, wireless access points, switches, routers, hubs, etc., or the like. As such, the receiver 110 may be connected to other devices and the receiver 110 may forward packets to the other devices.

According to a particular example, the receiver 110 is a wireless access point, which is generally a device that allows wireless communication devices, such as clients, to connect to a wireless network using a standard, such as an Institute of Electrical and Electronics Engineers (IEEE) 802.11 standard or other type of standard. The clients may include a wireless network interface for connecting to a wireless network, and may include an end user device, such as a laptop, desktop computer, cell phone, etc. The wireless network interface may commonly be referred to as a radio.

As also shown in FIG. 1, the receiver 110 may include a physical (PHY) layer 112 containing hardware component(s) that are to make frame receive decisions. That is, the hardware component(s) may determine whether to continue receiving a frame or to discontinue receiving a frame prior to forwarding the frame to a MAC layer 114 of the receiver 110. In one regard, therefore, the decision to continue or discontinue receipt of frames may be made at the PHY layer 112 of the receiver 110, which may prevent the receiver 110 from locking onto unnecessary frames. That is, instead of making the frame receive decision in the MAC layer 114, the frame receive decision may be made in the PHY layer 112 of the receiver 110, which may result in greater receiver 110 operation efficiency.

Figure 2:
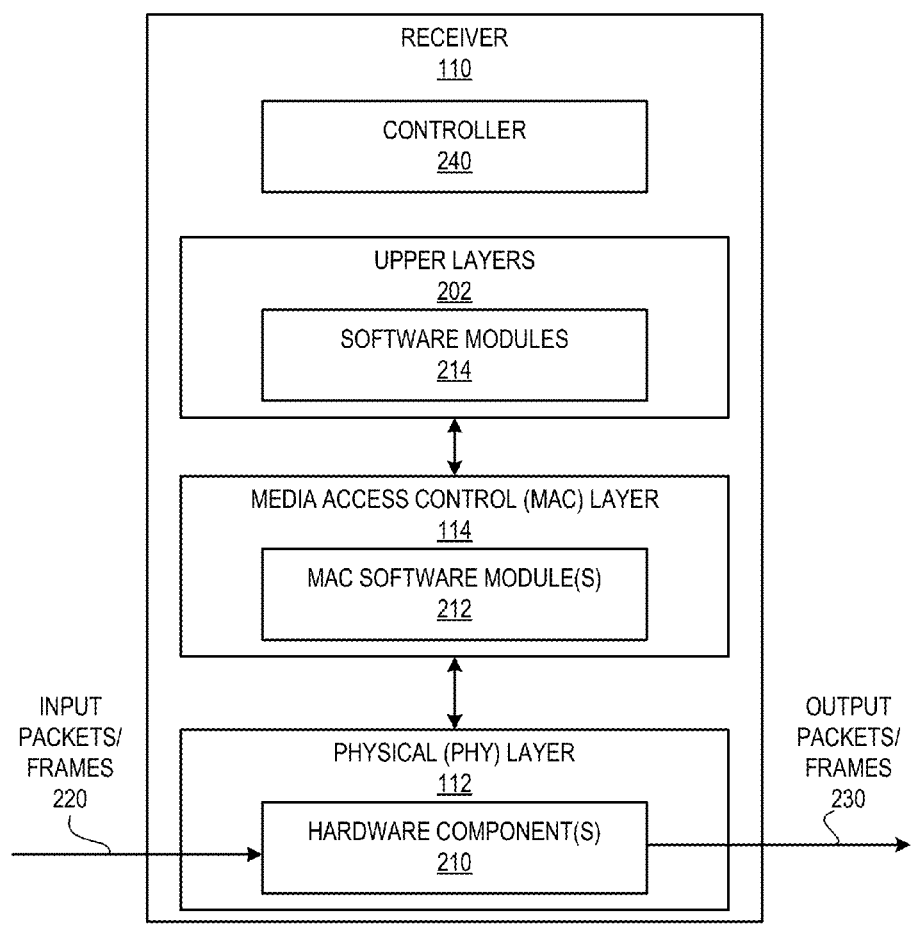
FIG. 2 depicts a simplified block diagram of the receiver depicted in FIG. 1, according to an example of the present disclosure.

Turning now to FIG. 2, there is shown a simplified block diagram 200 of the receiver 110 depicted in FIG. 1, according to an example. It should be understood that the receiver 110 depicted in FIG. 2 may include additional elements and that some of the elements depicted therein may be removed and/or modified without departing from the scope of the receiver 110.

The receiver 110 is depicted as including a PHY layer 112, a MAC layer 114, and upper layers 202. The PHY layer 112 is depicted as including hardware component(s) 210, the MAC layer 114 is depicted as including MAC module(s) 212, and the upper layers 202 are depicted as including software module(s) 214. The PHY layer 112, the MAC layer 114, and the upper layers 202 may be layers in the Open Systems Interconnection (OSI) model. In this regard, the upper layers 202 may include a network layer, a transport layer, a session layer, a presentation layer, and an application layer.

As shown in FIG. 2, the hardware component(s) 210, which may include various hardware components, e.g., circuits, physical connections, etc., that are to receive input packets/frames 220 from any of the transmitters 120*a*-120*n*. As discussed above, the receiver 110 may be a wireless radio and thus, the input packets/frames 220 may be received wirelessly. As discussed in greater detail herein below, the hardware component(s) 210 is to determine whether to continue receiving the input packets/frames 220 until the end of the frame transmission without first forwarding the input packets/frames 220 to the MAC layer 114. As also discussed below, if the hardware component(s) 210 determines that receipt of a frame 220 is to be discontinued, the hardware component(s) 210 may, for instance, enter a sleep mode during the frame transmission.

However, if the hardware component(s) 210 determines that receipt of a frame 220 is to be continued, the hardware component(s) 210 may continue to receive the frame 220 and may forward the frame 220 to the MAC layer 114. The MAC software modules 212 may examine transmitter and receiver MAC addresses to determine whether the frame is to be forwarded to the upper layers 202. Alternatively, because the frame receipt decision may have been made by the hardware component(s) 210, the MAC software module(s) 212 may simply forward the frame 220 to the upper layers 202. In any regard, the software modules 214 of the upper layers 202 may perform various operations on the frames 220, as may generally be performed in receivers. In instances in which the input frames 220 are to be outputted from the receiver 110 following processing by the software modules 214 in the upper layers 202, the hardware component(s) 210 may output the packets/frames 230.

The receiver 110 is also depicted as including a controller 240, which may be a microprocessor, a micro-controller, an application specific integrated circuit (ASIC), or the like. The controller 240 may perform various functions in the receiver 110, such as invoking or implementing the hardware component(s) 210, the MAC software modules 212, and the software modules 214. According to an example, the hardware component(s) 210 may be circuit components, individual circuits, or other hardware devices. In addition, the MAC software modules 212 and the software modules 214 may be machine readable instructions, stored, for instance, in a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like.

Figure 3:
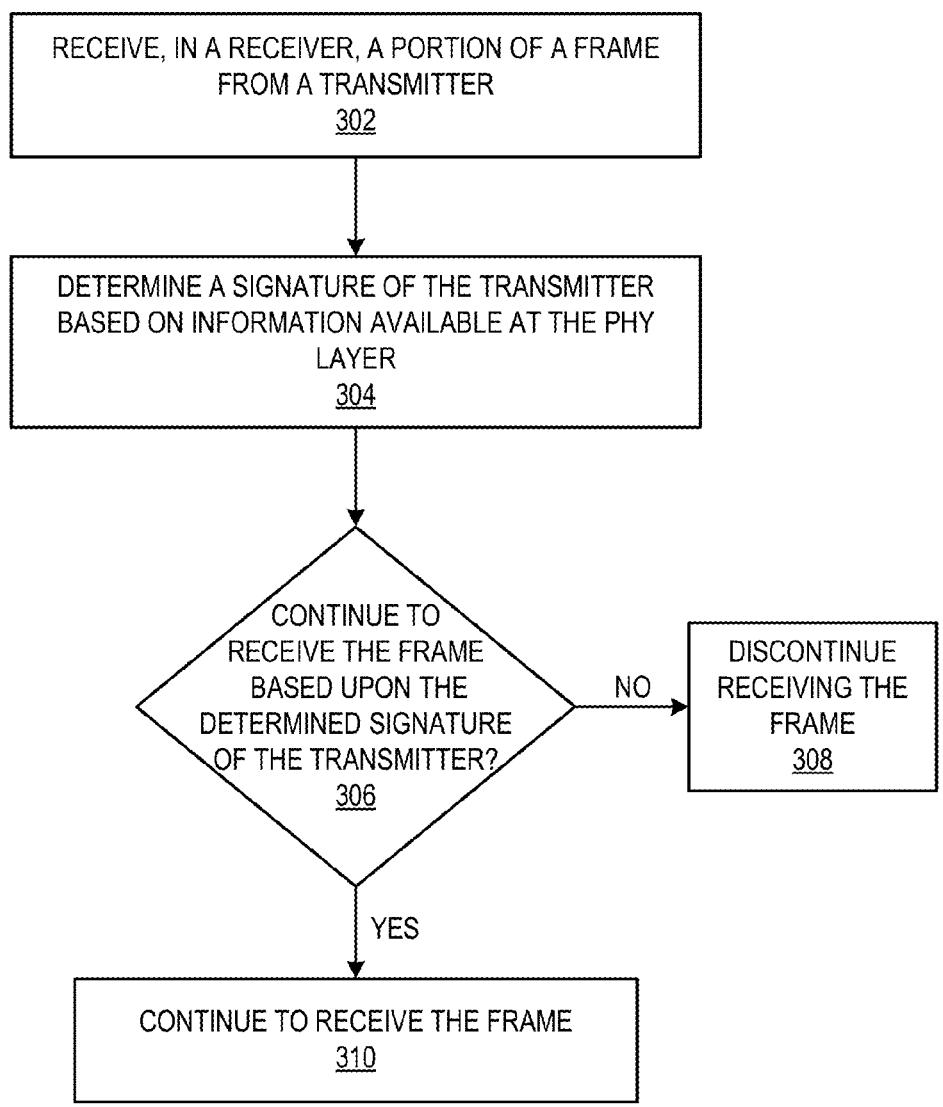
FIG. 3 depicts a flow diagram of a method of making a frame receive decision in a PHY layer of a receiver, according to an example of the present disclosure.

Turning now to FIG. 3, there is shown a flow diagram of a method 300 of making a frame receive decision in a PHY layer 112 of a receiver 110, according to an example. It should be apparent to those of ordinary skill in the art that the method 300 represents a generalized illustration and that other operations may be added or existing operations may be removed, modified or rearranged without departing from a scope of the method 300.

At block 302, a portion of a frame may be received in a receiver 110 having a PHY layer 112 from a transmitter 120*a*. Particularly, the hardware component(s) 114 of the PHY layer 112 may receive a first portion of the frame, which may be less than the entire frame and may contain information that is available at the PHY layer. By way of example, the portion of the frame may include a PHY header of the frame. In addition, the portion of the frame may be received wirelessly.

At block 304, a signature of the transmitter 120*a* may be determined based upon the information available at the PHY layer 112, for instance, by the hardware component(s) 114 of the PHY layer 112. The information available at the PHY layer 112 may include at least one of a center frequency offset (CFO) of the transmitter 120*a* with respect to the receiver 110 and channel state information (CSI) of the frame received from the transmitter 120*a*. In addition, the signature of the transmitter 120*a* may be determined based upon any combination of the CFO and the CSI, such as the CFO itself, the CSI itself, through application of any suitable function on the CFO and the CSI, etc. The signature of the transmitter 120a may include values or other characters, such as symbols, letters, etc., that may be used to distinguish the transmitters 120a-120n with respect to each other. In one particular example, the signature of the transmitter 120a may be equivalent to the CFO of the transmitter 120a with respect to the receiver 110. In further examples, the signature of the transmitter 120a may be determined as a function of the CFO of the transmitter 120a and the CSI of a frame received from the transmitter 120a.

With regard to the CFO of the transmitter 120a with respect to the receiver 110, in order for a transmitter 120a and a receiver 110 to communicate with each other, the frequency channels of both the transmitter 120a and the receiver 110 need to be tuned to the same channel. Each transmitter 120a and receiver 110 has its own reference crystal oscillator to generate the carrier signal (center frequency). The oscillators of different radios generally generate different center frequencies with respect to each other. The PHY layer frame structure of the IEEE 802.11ac specification, as well as the legacy 802.11a/b/g/n specifications, may start with training fields, such as L-STF or L-LTF. The hardware component(s) 210 may estimate the offset, i.e., the CFO, between the center frequency of the transmitter 120a and the center frequency of the receiver 110 through use of the information contained in the training fields. As such, the hardware component(s) 210 may determine the CFO of the transmitter 120a following receipt of the PHY layer frame structure.

Temperatures and differences in shape of each crystal in the radios may be the two main factors determining each oscillator frequency. It is extremely rare for the shapes of the crystals to be completely identical, and thus, the CFOs estimated from different transmitters 120a-120n are likely to be different from each other. In addition, as temperature changes vary slowly over time (e.g., minutes and hours) compared to typical intervals between consecutive frame transmissions from the same transmitter (e.g., less than a second), the CFO of a transmitter 120a may be used as a unique PHY layer signature for the receiver 110 to discriminate a transmitter 120a from other transmitters 120b-120n.

The CSI of a frame received from the transmitter 120a generally pertains to properties of the wireless channel between a transmitter and a receiver. That is, the CSI generally depends upon how the wireless signal propagates from the transmitter 120a to the receiver 110. Generally speaking, because wireless is a broadcast medium, the signal may propagate in all directions and may be reflected by various objects and walls before reaching the receiver 110. The reflecting effect may be called multipath. The CSI is essentially an amalgamation of several multipath reflections and because these reflections may combine differently every few centimeters, CSI of frames may be different even when the transmitters 120a-120n of the frames are in relatively close proximities to the receiver 110. According to an example, the receiver 110 may discriminate between the transmitters 120a-120n based upon the CSI's of the frames received from the transmitters 120a-120n. However, the CSI of frames received from a transmitter 120a may vary over time due to, for instance, the transmitter 120a moving or changes in the channel environment, but the CSI of frames may remain similar between consecutive packet transmissions. Thus, the receiver 110 may use the CSI from a previous packet to identify a consecutive packet from the transmitter 120a if the receipt time at which the CSI of the frame is determined is sufficiently close to a reference time at which a reference CSI of the frame was determined. The reference CSI of the frame, which is also described as a reference time at which the CSI of the frame received from the transmitter 120a was determined, is discussed in greater detail below with respect to FIG. 5.

The CSI of the frame received from a transmitter 120a may be computed by the hardware component(s) 210 in the receiver's physical layer 112 in order to perform the process of equalization. During equalization, the hardware component(s) 210 attempts to understand the channel, so as to remove its effect from the ongoing data reception. The CSI may be calculated during a known training sequence called the preamble and the calculation of the CSI may be a basic component of wireless reception, and hence this information may be available on all wireless receivers. For an OFDM system that operates under, for instance, IEEE 802.11a/g/n, CSI is represented as an array of complex quantities. The length of the array may depend on the number of subcarriers implemented by the physical layer.

When the hardware component(s) 210 is receiving a packet, the hardware component(s) 210 may compute the CSI of the packet or frame as an array of complex quantities. The hardware component(s) 210 may then refer to previously stored information that is to contain the reference CSI of the packet or frame received from the transmitter 120a. As discussed in greater detail below, the previously stored information may be contained in a table that correlates a plurality of signatures to respective category codes. If no such information is available, the hardware component(s) 210 may proceed to receive the frame, and may store the current CSI as if the frame is from the hardware component(s)' 210 own transmitter.

At block 306, a determination may be made as to whether receipt of the frame is to be continued, for instance, by the hardware component(s) 210 of the PHY layer 112. The determination may be made based upon, for instance, access to a table that indicates whether the signature indicates that frames from the transmitter 120a are to be forwarded to the MAC layer 114. Examples of the table are discussed in greater detail herein below.

According to an example, the determination at block 306 may indicate that receipt of the frame is not to be continued. In this example, and as indicated at block 308, the hardware component(s) 210 may discontinue, e.g., skip, receiving frames that match the determined signature. In addition, the hardware component(s) 210 may communicate an instruction for the receiver 110 to enter into a sleep mode for the duration of time that the frame occupies the receiver 110. In another example, the determination at block 306 may indicate that receipt of the frame is to be continued. In this example, and as indicated at block 310, the hardware component(s) 210 may continue to receive the frame for the duration of time that the frame occupies the receiver 110. The hardware component(s) 210 may also forward the received frame to the MAC layer 114.

Figure 4:
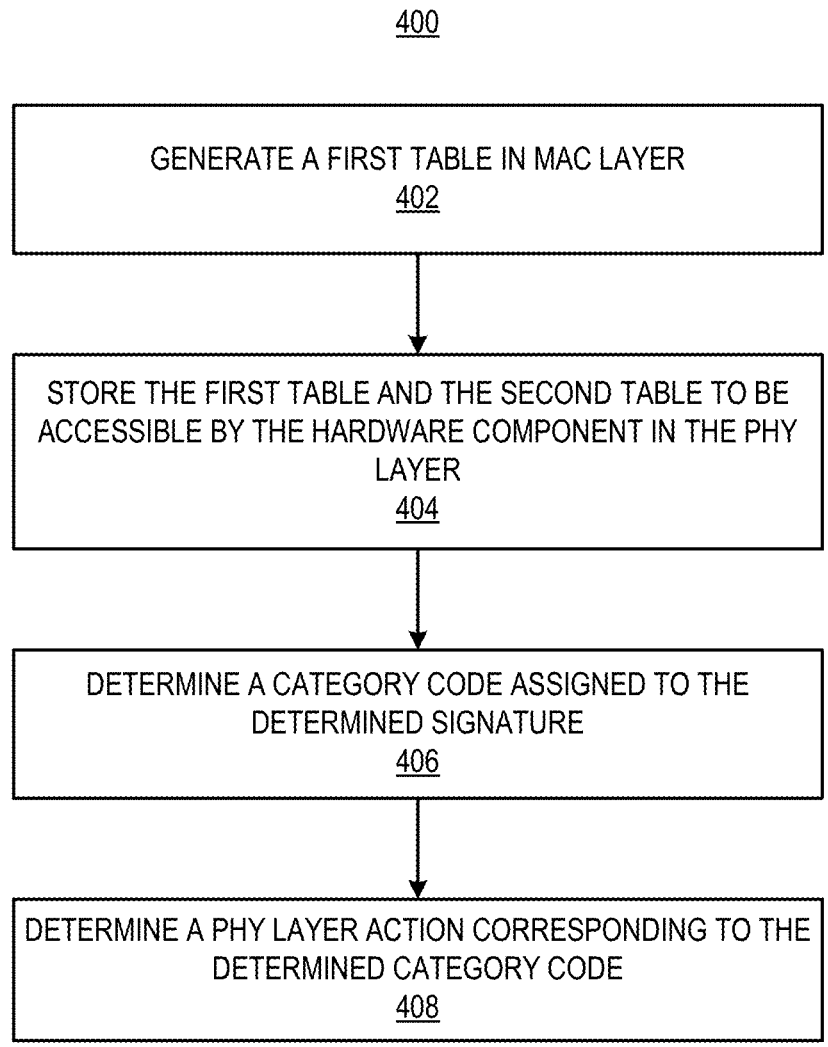
FIG. 4 shows a flow diagram of a method for setting up the hardware component(s) of the PHY layer in FIG. 3 to determine whether receipt of a frame is to be continued, according to an example of the present disclosure.

Turning now to FIG. 4, there is shown a flow diagram of a method 400 for setting up the hardware component(s) 210 to determine whether receipt of the frame is to be continued, according to an example. In one regard, the method 400 depicts operations that may be performed prior to the determination made at block 306 in the method 300.

At block 402, a first table may be generated, for instance, in the MAC layer 114. Block 402 may additionally include the updating of a previously generated first table. The first table may correlate a plurality of signatures to respective category codes. In addition, a second table may correlate a plurality of category codes to respective PHY layer actions. Alternatively, the first table may correlate a plurality of signatures directly to respective PHY layer actions. In this example, the information contained in the first table and the second table may be combined into a single table. In any regard, the first table and, in some examples, the second table, may be generated during a training phase of the hardware component(s) 210. For instance, the signatures of frames received from a plurality of transmitters 120a-120n may be determined through a determination of the information available at the PHY layer 112, such as the respective CFOs of the transmitters 120a-120n and/or CSIs of the frames received from the transmitters 120a-120n.

In one regard, information that indicates whether frames received from the transmitters 120a-120n are intended for the receiver 110 may be determined through tracking of the frames. That is, the MAC software module(s) 212 may determine which of the received frames corresponding to which of the signatures are intended for the receiver 110 and which are not. The MAC software module(s) 212 may also determine various actions that the hardware component(s) 210 are to perform on the frames based upon, for instance, the transmitters 120a-120n from which the frames are received. The MAC software module(s) 212 may also assign the determined actions to respective category codes. Examples of the category codes are described in greater detail below with respect to the second table.

According to an example, the CFO information may be provided as a 12-bit value from the hardware component(s) 210 to the MAC software module(s) 212, for each received frame. In order for the hardware component(s) 210 in the PHY layer 112 to use CFO to infer a transmitter, the MAC software module(s) 212 may build the first table by comparing the CFO of each received frame with its MAC header information including basic service set identification (BSSID) and transmitter MAC address. The first table may be maintained and updated by the MAC software module(s) 212 for the hardware component(s) 210 in the PHY layer to look up to find an appropriate action on subsequent frames. The first table may therefore serve two goals: 1) list CFOs that may be used to uniquely identify the corresponding transmitters, and 2) provide actions to be taken by the hardware component(s) 210 when a frame with a mapping CFO arrives at the hardware component(s) 210.

Regarding the first goal, because there may still be a chance for two transmitting oscillators to generate almost identical frequency offsets and result in measured CFOs at a common receiver that are very close to one another, the MAC software module(s) 212 may select CFOs that do not overlap with each other within a certain range and may include only those CFOs in the first table. In other words, if any two CFOs from two different transmitters 120a-120n satisfy the following condition, the MAC software module(s) 212 may exclude them from the first table to substantially prevent the hardware component(s) 210 from taking an incorrect action:

$$|CFO\_a - CFO\_b| <= delta, \quad \text{Equation (1):}$$

where, CFO_a and CFO_b are the time-averaged CFO values from two different transmitters a and b. Time-averaging may be necessary because the CFO is a time-varying value, due to temperature, though changing very slowly over time. A prediction model or Kalman Filter mechanism may be used to track the tendency of time-variance. The threshold delta may be chosen based upon, for instance, the granularity (resolution) of the CFO reported by the hardware component(s) 210.

According to an example, the MAC software module(s) 212 may determine the signatures of the transmitters 120a-120n based upon both the CFOs and the CSIs because of the potential for multiple CFOs of transmitters 120a-120n to be nearly identical to each other. In other examples, the MAC software module(s) 212 may determine the signatures of the transmitters 120a-120n based upon both the CFOs and the CSIs of the transmitters 120a-120n whose CFO deltas are below a predetermined threshold value.

The MAC software module(s) 212 may also update the first table as new frames are received. However, over time, the MAC module(s) may not receive a sufficient number of fresh samples to update the first table, and thus, the entries in the first table may be aged. In this regard, each entry in the first table may include a last update time field, which the hardware component(s) 210 may use to determine whether frames need to be received and forwarded to the MAC layer 114 regardless of the actions corresponding to the category codes matched to the frames in first table. The threshold at which the hardware component(s) 210 is to receive and forward frames regardless of their respective PHY layer actions (or category codes) may be set to a time value that generally enables efficient and accurate processing of the frames. In other examples, the threshold may be user defined. An example of the columns contained in a first table is provided below:

TABLE 1

| SIGNATURE | CATEGORY CODE | LAST UPDATE TIME |
| --- | --- | --- |

The second table may identify a category code and the PHY layer actions that the hardware component(s) 210 is to perform. For instance, the second table may include a plurality of category codes, in which each of the category codes defines a possible action based on the role of the transmitter that transmitted the frame relative to the receiver. An example of a second table is provided below, in which the receiver 110 is a client radio.

TABLE 2

| | PHY Layer Actions | | |
| --- | --- | --- | --- |
| Category Code | Lock and Receive until end of frame? | Sleep During the Frame time? | Can transmit during the frame time? |
| C1: The AP serving the client | Yes | No | No |
| C2: Clients under the same BSSID | No | Yes | No |
| C3: Other APs than the serving AP | Yes, If MCS is a broadcast/ multicast rate | Yes, if MCS is NOT one of the broadcast/ multicast rate | If MCS is NOT one of the broadcast/ multicast rates, may transmit when the frame RSS is below the carrier sense CCA threshold |
| C4: Clients under a different BSSID | No | Yes | May transmit when the frame RSSI is below the carrier sense CCA threshold |

In Table 2, MCS refers to modulation and coding scheme, BSSID refers to basic service set identification, RSSI refers to Received (or Relative) Signal Strength Indicator, and CCA refers to clear channel assessment. It should be clearly understood that the data contained in Table 2 are for purposes of illustration and that the second table may include other types of category codes and PHY layer actions. In addition, the second table may be implemented to simplify identification of the PHY layer actions that the hardware component(s) 210 is to perform on the received frames.

At block 404, the first table and the second table may be stored in a memory location that is accessible by the hardware component(s) 210 in the PHY layer 112. Thus, for instance, the first table and the second table may be stored within a memory of the PHY layer 112.

At block 406, a category code (or PHY layer action directly) assigned to the signature of the transmitter 120a determined at block 304 (FIG. 3) may be determined from the first table. Particularly, the hardware component(s) 210 may access the first table to determine which category code is assigned to the determined signature of the transmitter 120a.

At block 408, a PHY layer action corresponding to the determined category code may be determined by the hardware component(s) 210. Particularly, the hardware component(s) 210 may access the second table to determine the PHY layer action to be performed as indicated by the determined category code. The hardware component(s) 210 may use the determined PHY layer action to determine whether to continue to receive the frame based upon the determined signature. That is, the determined PHY layer action may indicate to the hardware component(s) 210 whether to continue to receive the frame or not. In addition, the hardware component(s) 210 may use the determined PHY layer action to determine whether the receiver 110 is to perform other PHY layer actions.

Figure 5:
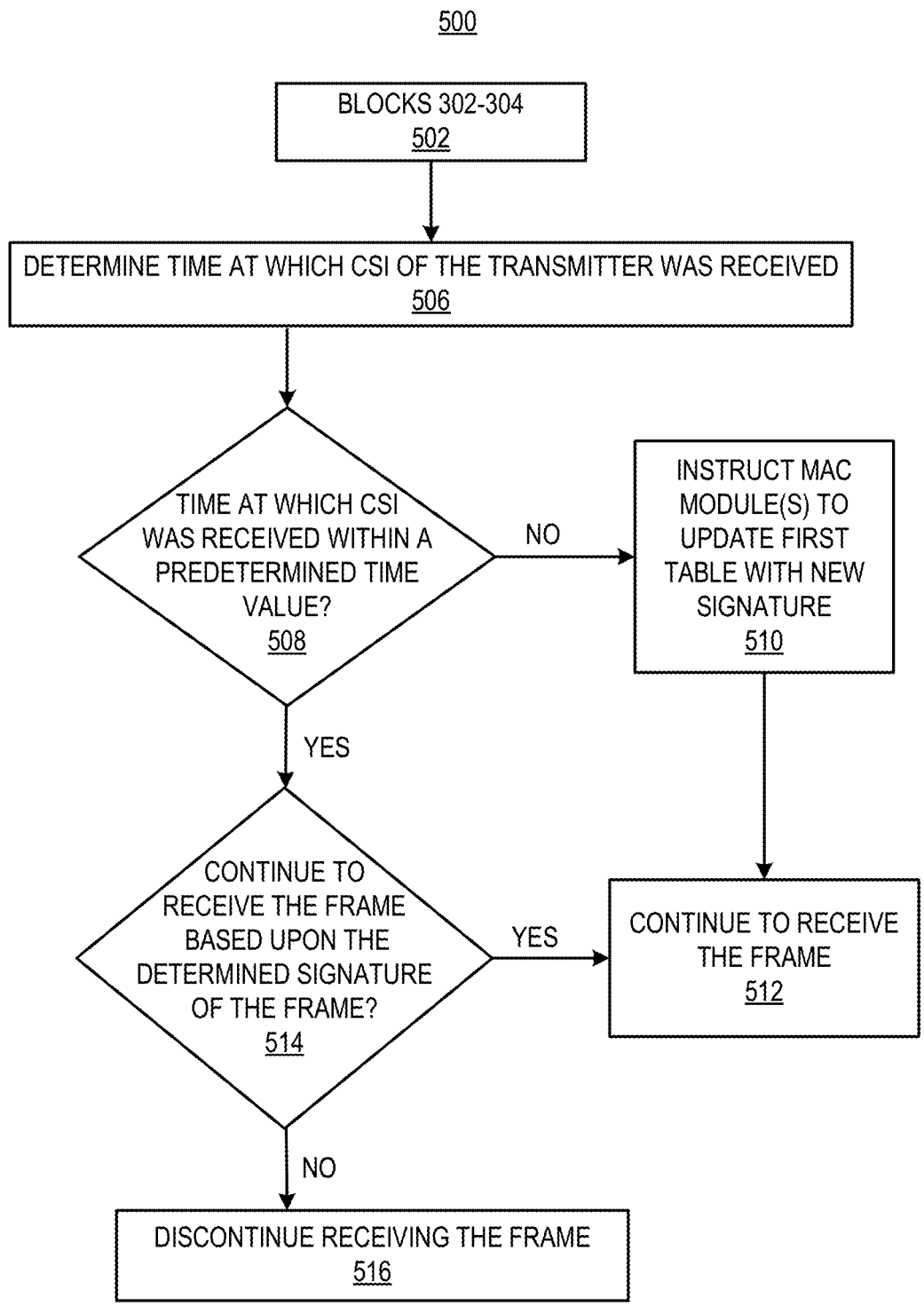
FIG. 5 shows a flow diagram of a method of making a frame receive decision in a PHY layer of a receiver, according to another example of the present disclosure.

Turning now to FIG. 5, there is shown a flow diagram of a method 500 of making a frame receive decision in a PHY layer 112 of a receiver 110, according to another example. In one regard, the method 500 depicts operations that may be performed following blocks 302 and 304 in the method 300, in which the determination of the signature of the transmitter 120a may be based upon the CSI of the frame received from the transmitter 120a. As such, the operations described with respect to the method 500 may be implemented in place of block 306 or viewed alternatively, block 306 may be expanded to include the features of the method 500.

At block 502, blocks 302 and 304 discussed above with respect to FIG. 3 may be implemented to determine the signature of the transmitter 120a based upon the CSI of the packet or frame received from the transmitter 120a. The determination made at block 502 may also be based upon the CFO of the transmitter 120a.

At block 506, a receipt time at which the CSI of the portion of the frame was received from the transmitter 120a at block 302 may be determined. In addition, at block 508, a determination may be made as to whether the receipt time is within a predetermined time value from a reference time. According to an example, the reference time is the time at which the signature of the transmitter 120a used in the generation (or update) of the first table was determined. In addition, the predetermined time value may be a relatively short period of time, for instance, around 100 milliseconds. The predetermined time value may be set to be equal or linear to a channel coherence time. In the case of CFO, a predetermined time value between a receipt time at which the CFO is determined and a reference CFO time may be much longer than the predetermined time value of the CSI time and may depend on the clock drift between the transmitter 120a and the receiver 110.

In response to a determination that the time at which the CSI of the transmitter 120a was received is outside of the predetermined time value from the reference time, e.g., exceeds the predetermined time value, the CSI of the frame received from the transmitter 120a may not be used to determine the signature of the transmitter 120a. In addition, the hardware component(s) 210 may instruct the MAC software module(s) 212 to update the first table with the new signature, as indicated at block 510. The hardware component(s) 210 may also continue to receive the frame as indicated at block 512.

However, in response to a determination that the time at which the CSI of the frame received from the transmitter 120a was received is within the predetermined time value from the reference time, e.g., falls below the predetermined time value, the CSI of the received frame may be used to determine the signature of the transmitter 120a. In addition, at block 514, a determination may be made as to whether receipt of the frame is to be continued, for instance, by the hardware component(s) 210 of the PHY layer 112. The determination may be made based upon, for instance, access to the first table discussed above. Depending upon the information contained in the first table, the hardware component(s) 210 may continue to receive the frame at block 512 or may discontinue receipt of the frame at block 516.

In addition or alternatively to a comparison of the time at which the CSI of the received frame was received and the reference time, a correlation value between the previous CSI used to determine the signature stored in the first table and the current CSI may be used to determine whether to use the current CSI in making the determination at block 514. That is, for instance, if the correlation value is greater than a predetermined threshold, for instance, 0.9, the hardware component(s) 210 may determine that the current packet is from its intended transmitter 120a and may proceed to block 514. Otherwise, the hardware component(s) 210 may proceed to block 510.

Figure 6:
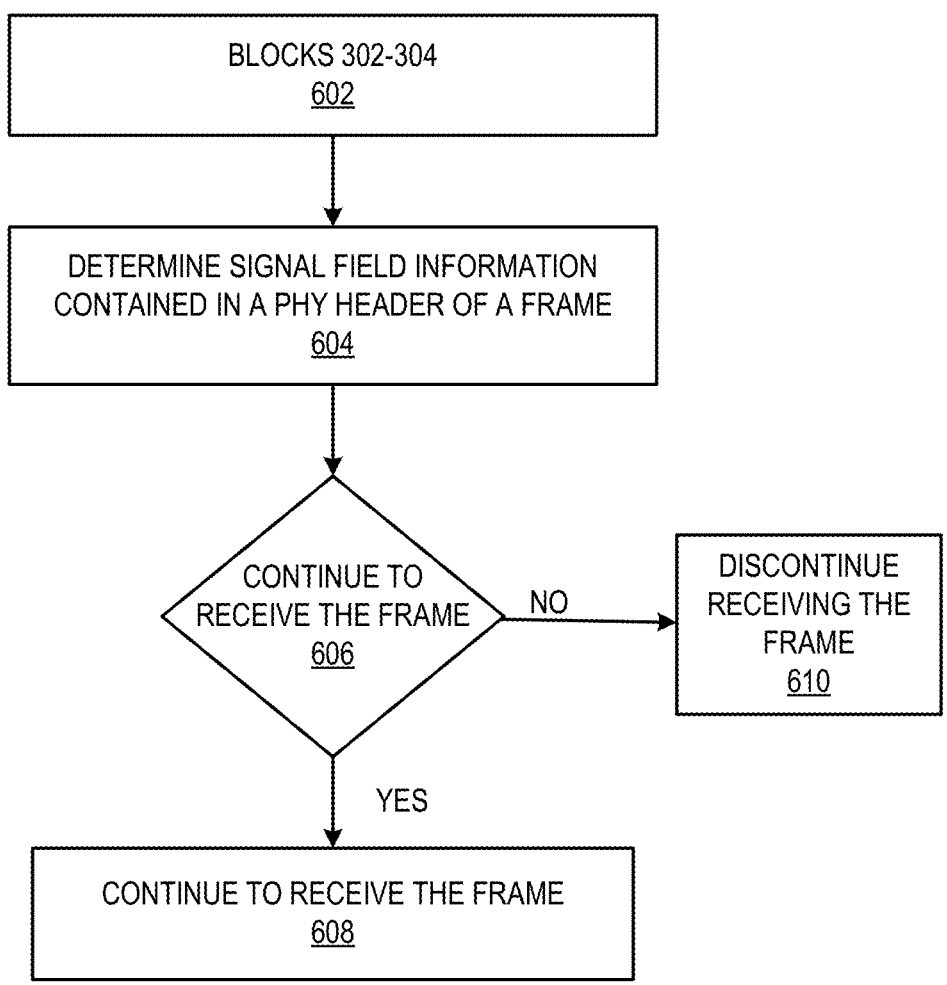
FIG. 6 shows a flow diagram of a method of making a frame receive decision in a PHY layer of a receiver, according to another example of the present disclosure.

Turning now to FIG. 6, there is shown a flow diagram of a method 600 of making a frame receive decision in a PHY layer 112 of a receiver 110, according to another example. In one regard, the method 600 depicts operations that may be performed following blocks 302 and 304 in the method 300, in which the determination of the signature of the transmitter 120a may be based upon the information available at the PHY layer 112. As such, the operations described with respect to the method 600 may be implemented in place of block 306 or viewed alternatively, block 306 may be expanded to include the features of the method 600.

At block 602, blocks 302 and 304 discussed above with respect to FIG. 3 may be implemented to determine the signature of the transmitter 120a based upon either or both of the CFO of the transmitter 120a and the CSI of the frame received from the transmitter 120a.

At block 604, signal field information contained in a PHY header of the frame may be determined, for instance, by the hardware component(s) 210. Generally speaking, the PHY header contains SIGNAL fields that provide information needed to decode the frame data, such as frame length, modulation and coding scheme, etc. This information may also include additional information such as STBC (Spatial Time Block Coding), number of spatial time streams, beamforming, guard interval, multi-user beamforming GROUP_ID, etc. Because each transmitter 120a-120n and receiver 110 may have different PHY layer capabilities, which they may announce during the association process or in beacons (in the case of an AP), the SIGNAL field information may be used to infer the transmitter 120a and the intended receiver 110 of the frame. For example, if the number of supported spatial time streams specified in the SIGNAL field is larger than the number of receive antennas at the radio, the frame may be determined as not being intended for the radio. Similarly, if the number of supported spatial time streams specified in the SIGNAL field is larger than the maximum number of supported streams of the AP that the client radio is connected to, the frame may be determined as not being from the AP.

Since there may be multiple transmitters and receivers having similar PHY capabilities in a network, the information in the SIGNAL field may not necessarily identify a unique transmitter or receiver. However, the information contained in the SIGNAL field may be used to filter out unnecessary frames. For instance, the GROUP_ID of the upcoming IEEE 802.11 ac PHY header may be used to indicate the group of intended receivers of downlink multi-user beam-forming and thus the group ID contained in the SIGNAL field may be used to make an accurate frame receive decision.

According to an example, as the SIGNAL field information may be too large to be included in the first table, the MAC software module(s) 212 may share the PHY capability of its serving AP with the hardware component(s) 210 so that the hardware component(s) 210 may filter out frames with SIGNAL field information not supported by the hardware component(s) 210 and also the serving AP.

At block 606, a determination may be made as to whether receipt of the frame is to be continued, for instance, by the hardware component(s) 210 of the PHY layer 112. The determination may be made based upon, for instance, access to the first table and a determination of which action to perform based upon the correlation of the signature of the transmitter 120a and the action discussed above. In addition, at block 606, a determination as to whether to continue to receive the frame may also be based upon the determined signature of the transmitter and the signal field information. Depending upon the information contained in the first table as well as the signal field information indicates that the frame is intended for the receiver 110, the hardware component(s) 210 may continue to receive the frame at block 608 or may discontinue receipt of the frame at block 610. In one regard, the signal field information together with the signature of the transmitter 120a may provide enhanced accuracy in making a frame receive decision in the PHY layer 112 of the receiver 110.

Some or all of the operations set forth in the methods 300-600 may be contained as a utility, program, or subprogram, in any desired computer accessible medium. In addition, the methods 300-600 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 7:
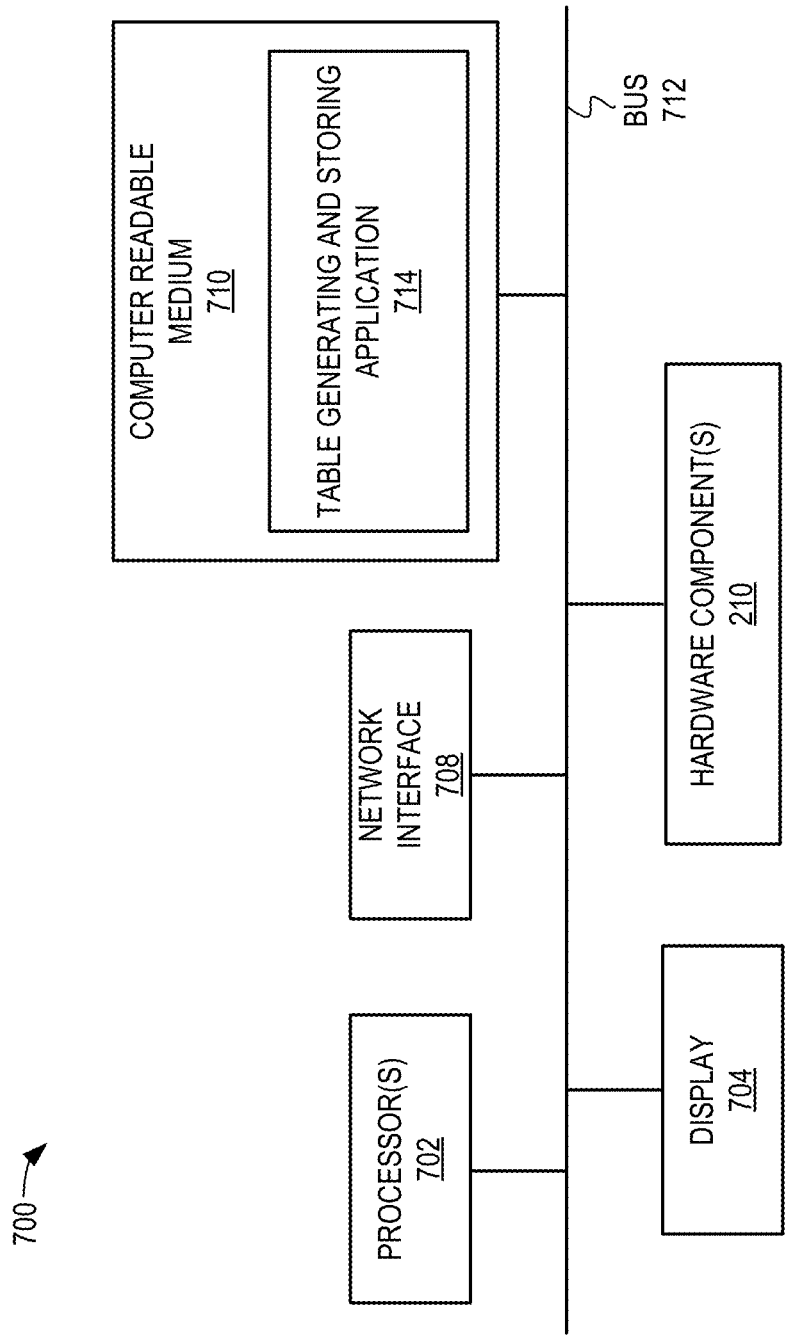
FIG. 7 illustrates a schematic representation of a computing device, which may be employed to perform various functions of the receiver depicted in FIGS. 1 and 2, according to an example of the present disclosure.

Turning now to FIG. 7, there is shown a schematic representation of a computing device 700, which may be employed to perform various functions of the receiver 110 depicted in FIGS. 1 and 2, according to an example. The device 700 may include a processor 702, a display 704, such as a monitor; a network interface 708, such as a Local Area Network LAN, a wireless 802.11x LAN, a 3G mobile WAN or a WiMax WAN; and a computer-readable medium 710. The 700 device is also depicted as include the hardware component(s) 210. Each of these components may be operatively coupled to a bus 712. For example, the bus 712 may be an EISA, a PCI, a USB, a FireWire, a NuBus, or a PDS.

The computer readable medium 710 may be any suitable medium that participates in providing instructions to the processor 702 for execution. For example, the computer readable medium 710 may be non-volatile media, such as an optical or a magnetic disk; volatile media, such as memory. The computer-readable medium 710 may also store a table generating and storing application 714, which may provide various components for generating a first table and, in some examples, a second table, and for storing the first table (and the second table), as described above with respect to the method 400 in FIG. 4. In any regard, the first table and the second table may be stored at a location that enables the hardware component(s) 210 to access the first table and the second table, for instance over the bus 712. Alternatively, the first table and the second table may be stored directly on the hardware component(s) 210.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method of making a frame receive decision, said method comprising:
    receiving, in a receiver having a physical (PHY) layer, a PHY header portion of a frame from a transmitter, wherein the PHY header portion of the frame comprises information available at the PHY layer;
    determining, by a hardware component in the PHY layer, a signature of the transmitter based upon the information available at the PHY layer, wherein the signature is determined prior to the frame being forwarded to a software media access control (MAC) layer of the receiver; and
    determining, by the hardware component in the PHY layer, whether to continue to receive a remainder of the frame based upon the determined signature of the transmitter, wherein whether to continue to receive the remainder of the frame is determined prior to the frame being forwarded to a software media access control (MAC) layer of the receiver.

2. The method according to claim 1, wherein determining whether to continue to receive the remainder of frame based upon the determined signature of the transmitter further comprises:
    determining a category code assigned to the determined signature; and
    determining a PHY layer action corresponding to the determined category code.

3. The method according to claim 2, wherein determining the category code of the determined signature further comprises:
    accessing a first table that correlates a plurality of signatures to respective category codes; and determining, in the PHY layer, from the first table, the category code corresponding to the determined signature.

4. The method according to claim 3, wherein determining a PHY layer action corresponding to the determined category code further comprises:
accessing a second table that correlates a plurality of category codes to respective PHY layer actions; and
determining, in the PHY layer, from the second table, the PHY layer action corresponding to the category code of the determined signature, wherein the PHY layer action comprises a PHY layer action selected from the group consisting of continuing to receive the remainder of the frame, sleeping during a frame time; and whether the transmitter is permitted to transmit during the frame time.

5. The method according to claim 4, further comprising:
generating the first table in a software layer of the receiver; and
storing the generated first table to be accessible by the PHY layer.

6. The method according to claim 1, wherein the information available at the PHY layer comprises at least one of a center frequency offset (CFO) of the transmitter with respect to the receiver and a channel state information (CSI) of the frame received from the transmitter.

7. The method according to claim 1, wherein the information available at the PHY layer comprises a channel state information (CSI) of the frame received from the transmitter, said method further comprising:
determining a receipt time at which the header portion of the frame was received from the transmitter;
determining whether the receipt time is within a predetermined time value from a reference time;
determining whether to continue to receive the remainder of the frame based upon the determined signature of the transmitter in response to the receipt time being within the predetermined time value; and
inserting into a first table that correlates a plurality of signatures to respective category codes, a new signature that is based upon the CSI of the transmitter in response to the time being outside of the predetermined time value.

8. The method according to claim 1, further comprising:
determining signal field information contained in the PHY header of the frame; and
wherein determining whether to continue to receive the remainder of the frame further comprises determining whether to continue to receive the remainder of the frame based upon the determined signature of the transmitter and the signal field information.

9. A receiver to receive frames from a plurality of a transmitters, said receiver comprising:
a media access control (MAC) software layer;
a hardware component in a physical (PHY) layer to receive a PHY header portion of a frame from a transmitter, wherein the PHY header portion of the frame comprises information available at the PHY layer, and wherein the PHY layer, to determine whether to communicate the frame to the MAC software layer, is to:
determine, by the hardware component in the PHY layer, a signature of the transmitter based upon the information available at the PHY layer, wherein the signature is determined prior to the frame being forwarded to the MAC software layer of the receiver;
determine, by the hardware component in the PHY layer, whether to continue to receive a remainder of the frame based upon the determined signature of the transmitter, wherein whether to continue to receive the remainder of the frame is determined prior to the frame being forwarded to the MAC software layer of the receiver; and
implement the determination of whether to continue to receive the remainder of the frame.

10. The receiver according to claim 9, wherein the hardware component is to determine a PHY layer action assigned to the determined signature and to implement the PHY layer action without first communicating the frame to the software layer.

11. The receiver according to claim 9, wherein the information available at the PHY layer comprises at least one of a center frequency offset (CFO) of the transmitter with respect to the receiver and a channel state information (CSI) of the frame received from the transmitter.

12. The receiver according to claim 9, wherein the information available at the PHY layer comprises a channel state information (CSI) of the frame received from the transmitter, and wherein the hardware component is further to:
determine a receipt time at which the PHY header portion of the frame was received from the transmitter;
determine whether the receipt time is within a predetermined time value from a reference time;
determine whether to continue to receive the frame based upon the determined signature of the transmitter in response to the receipt time being within the predetermined time value; and
insert into a first table that correlates a plurality of signatures to respective category codes, a new signature that is based upon the CSI of the transmitter in response to the time being outside of the predetermined time value.

13. The receiver according to claim 12, wherein the hardware component is further to:
determine signal field information contained in the PHY header portion of the frame; and
determine whether to continue to receive the remainder of the frame based upon the determined signature of the transmitter and the signal field information.

14. A non-transitory computer readable storage medium on which is stored machine readable instructions that when executed by a processor are to cause the processor to:
receive, in a receiver having a physical (PHY) layer, a plurality of PHY header portions of frames from a plurality of transmitters;
determine, by a hardware component in the PHY layer, respective signatures of the transmitters based upon the information available at the PHY layer, wherein the respective signatures are determined prior to the plurality of PHY header portions being forwarded to a media access control (MAC) software layer of the receiver;
correlate, by the hardware component in the PHY layer, the signatures of the transmitters to a PHY layer action;
generate, by the MAC software layer, a table that includes the signatures of the transmitters and their correlated PHY layer actions; and
store the generated table within a memory of the PHY layer.

* * * * *